Jan. 30, 1934.   J. H. BORDEN   1,945,392
ELEVATOR CONTROL SYSTEM
Filed Nov. 29, 1930   3 Sheets-Sheet 2
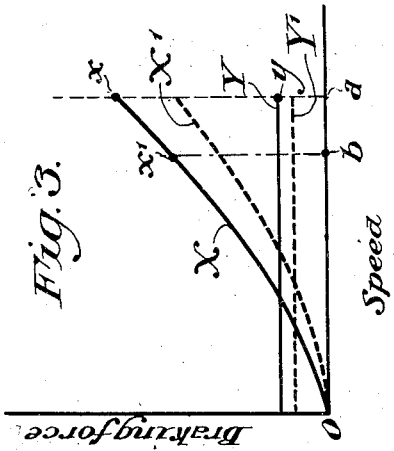
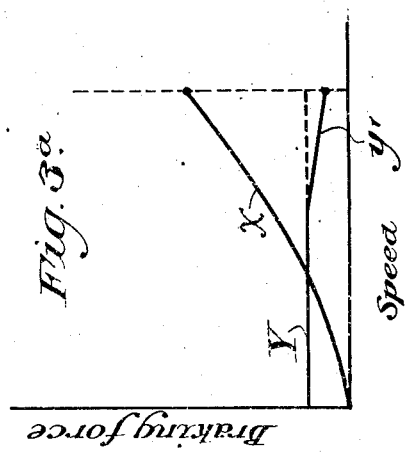
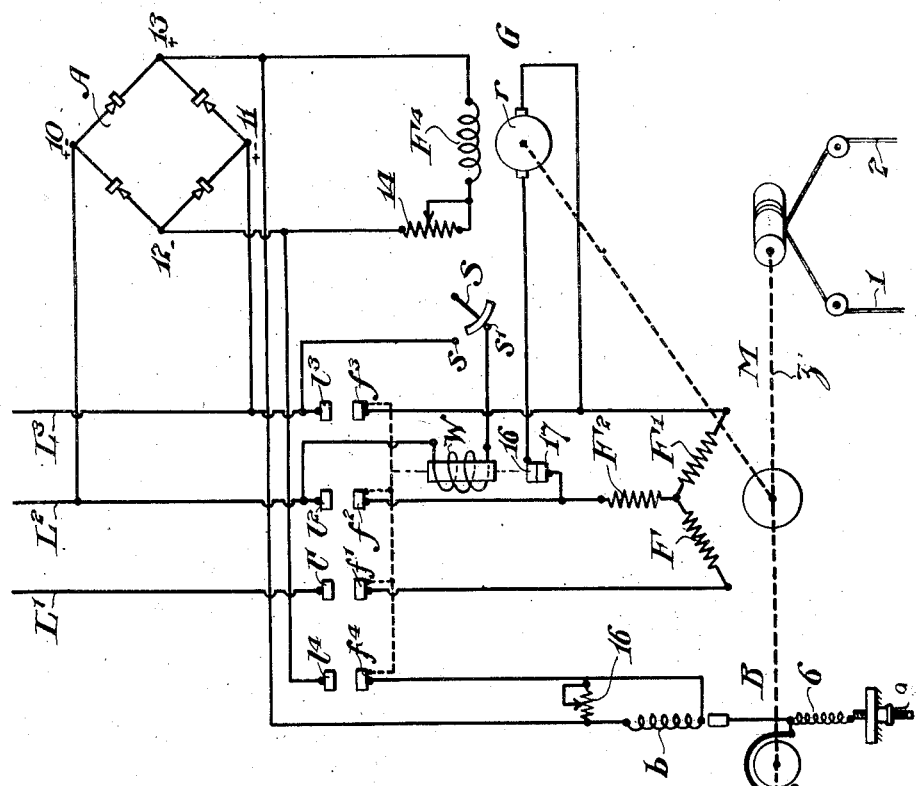
Inventor
Joseph H. Borden
Cornelius L. Ehret
By his Attorney.

Jan. 30, 1934.   J. H. BORDEN   1,945,392
ELEVATOR CONTROL SYSTEM
Filed Nov. 29, 1930   3 Sheets-Sheet 3

Patented Jan. 30, 1934

1,945,392

UNITED STATES PATENT OFFICE 1,945,392

ELEVATOR CONTROL SYSTEM

Joseph H. Borden, Philadelphia, Pa., assignor to Atlantic Elevator Company, Philadelphia, Pa., a corporation of Pennsylvania Application November 29, 1930
Serial No. 498,955

1 Claim. (Cl. 172—179)

My invention relates to elevator systems and particularly to braking systems for alternating current motors.

In accordance with my invention, the hoisting and lowering motor of an elevator system is decelerated by energizing the motor with direct current, after it is disconnected from the power source, which may be an alternating current supply line, the reaction between the armature and the field of the motor producing a braking force whose magnitude is dependent upon the armature speed.

More particularly and in one form of my invention, the voltage of the applied direct current also varies with the motor speed, so that the braking force varies with respect to the motor speed at a rate higher than the first power and specifically, substantially as the square of the motor speed; more specifically, the motor which may be of the alternating or direct current type is mechanically coupled to a direct-current generator for supplying current to the motor windings after they are disconnected from the power source and so long as the motor continues to rotate.

Further in accordance with my invention, when the elevator motor is of the alternating current type, the direct current for energizing the motor windings for braking may be obtained from a rectifier system supplied from the same alternating current source as the motor, and the rectified output is applied either directly to the motor windings, or indirectly thereto as by utilizing it to energize the field windings of the aforesaid direct-current generator.

Further in accordance with my invention, the disconnection of the motor from the supply line automatically effects energization of the motor by direct current for producing the electrical braking action, and preferably the disconnection also automatically sets a mechanical or friction brake; specifically, the electrical and mechanical brakes are complementary in their action, the mechanical braking action preponderating at low speed and the electrical braking action preponderating at high speed.

My invention further resides in the features of combination and arrangement hereinafter described and claimed.

For an understanding of my invention and for illustration of some of the forms it may take, reference is to be had to the accompanying drawings in which:

Fig. 2 is a modified form of the system shown in Fig. 1.

Figs. 3 and 3a are explanatory curves.

In the operation of elevators, as the car, cage, or platform approaches a stopping point or floor, the elevator motor is de-energized by the operator when the cage, or equivalent, is at a distance from the stopping point which in his judgment is the equal to the distance through which the cage will coast before being stopped by the friction brake applied upon de-energization of the motor, or in automatic systems, at a predetermined fixed distance from the stopping point. In both cases, it is desirable that the cage come to rest with its floor substantially flush with the loading or unloading floor or platform without need of again starting and stopping the motor.

As ordinarily the load carried by the elevator car varies widely, this desirable mode of operation is not practically possible with a fixed setting of the usual solenoid-operation friction brake, particularly in the modern, high-speed elevator systems in which the car speed is in excess of 100 feet per minute. In the automatic stop systems, if the brake is adjusted to stop the car level with the floor for a certain load, it will stop the car above or below the floor for greater or lesser loads. Further, if the brake in either an automatically or manually controlled system is adjusted to bring the car to a stop in a reasonably short distance consistent with high speed operation, there is an abrupt braking action which is uncomfortable to the passengers and a strain to the elevator system. Temperature and other atmospheric conditions also affect the action of mechanical brakes.

In general, it is the purpose of my invention to produce a braking system in which the load and other variables are compensated for or their effects minimized.

Figure 1:
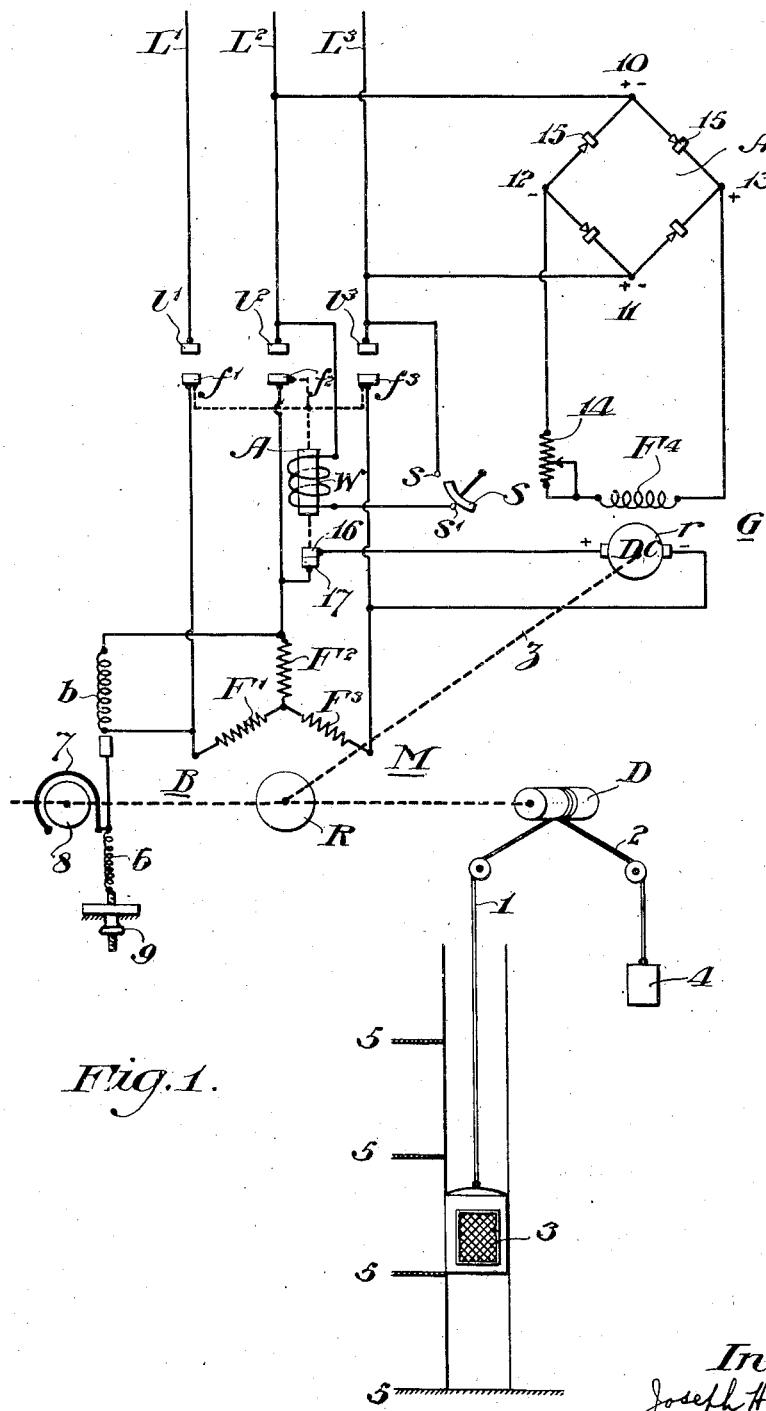
Fig. 1 illustrates diagrammatically an elevator system utilizing my invention.

Referring to Fig. 1, which diagrammatically illustrates a simplified elevator system with directional relays, automatic stop systems, etc., omitted for purposes of clarity of understanding of the invention, the field windings F1, F2 and F3 of the elevator motor M are energized from the three-phase line L1, L2, L3, through the contactor C having the fixed contacts 11, 12, and 13 adapted to engage respectively the movable contacts $f1$, $f2$, and $f3$. When the control switch S is moved to closed circuit position bridging the contacts $s$, $s1$, either by an operator or automatic stop mechanism in the usual and well known manner, the winding W of the contactor C is energized from phase L2, L3, the armature A moving the contacts f1, f2, and f3 to closed circuit position to energize the elevator motor M. The rotor R of the motor is mechanically connected, as indicated by the dotted line z, through the usual and suitable speed reducing means, not shown, to the drum D, or equivalent, upon which is wound the cables 1 and 2 supporting respectively the elevator cage 3, or equivalent, and the counter-weight 4.

As the cage 3 approaches one of the floors 5, at which it is desired to stop, the switch s, either manually by the elevator operator, or automatically, is moved to open circuit position, de-energizing the contactor winding W, whereupon the contacts f1, F2, and f3 move to open circuit position under the influence of gravity, or a spring, not shown, de-energizing the motor windings and simultaneously de-energizing the winding b of the solenoid brake B, permitting the spring 6 to move the brake shoe or band 7 against the brake drum 8, mounted upon or mechanically connected to the shaft of rotor R. The braking force may be adjusted by changing the spring 6, or by adjusting its tension as generically indicated by the hand wheel 9. As mentioned before, it is not possible in practice to adjust the friction brake B so that the cage 3 will always come to rest with its floor substantially flush with the desired floor 5, since the load and other conditions vary widely. The system of Fig. 1, however, utilizes additional means for producing a braking or retarding force which automatically compensates to greater or less degree for the load and other variations.

The rotor R of the elevator motor is mechanically coupled as indicated by dotted line z to the armature r of a direct-current generator G whose field F4 receives uni-directional current from the rectifier system A connected to the same alternating current source which supplies the elevator motor. The capacity of the generator G may be small, for example, its rating may be about one-tenth of that of motor M. Specifically, in the system shown, the input terminals 10 and 11 of the rectifier are connected to the alternating current lines L2, L3, and the output or direct current terminals 12, 13 of the rectifier are connected to the generator field winding F4 preferably through an adjustable resistance 14, whose purpose is hereinafter explained. The rectifiers 15 of the system A may be of any desired type, for example, thermionic tubes, mercury vapor arcs, or preferably solid rectifiers, as of the copper copper-oxide type.

In the particular rectifier system shown, the rectifiers are arranged in bridge form, although it will be understood that other and usual arrangements may be utilized.

In the system thus described, when the control switch S is opened, de-energization of the contactor winding W effects closure of the contacts 16 and 17, completing a circuit including windings F2 and F3 of the elevator motor and the armature of the direct current generator G. As the rotor R of the motor continues to revolve after disconnection from the alternating current supply, due to the inertia of the system including the cage 3, counter-weight 4, etc., current is generated in the windings of the rotor R. As rotor windings form a closed circuit, of rather low resistance, the motor being of the usual squirrel cage type, for elevator service there is a magnetic drag upon the rotor whose magnitude is dependent upon and which tends to reduce the rotor speed. The greater the tendency of the cage 3 to continue in motion, or generally the higher its speed, the greater the electrical braking force, and vice versa. The characteristic of this braking action may conveniently be varied by changing the field excitation of the direct current generator G as by adjustment of rheostat 14.

Since the potential of the direct current applied to the motor field windings decreases with decrease of speed, and the current induced in the armature is a function of both the rotor speed and the field excitation, the electrical or magnetic braking force varies substantially as the square of the speed of the rotor, generally as indicated by the curve X, Fig. 3. The effect of changing the adjustment of rheostat 14 is in effect to swing the curve about the point O since in all cases the electrical braking effect is zero, at zero speed of the rotor.

Since there is no electrical braking action when the rotor R is at rest, a mechanical brake, such as the solenoid brake B, as previously described, is preferably also employed. However, the mechanical brake is preferably adjusted so that it exerts a force not materially in excess of that required to hold the car after it has stopped, and this force is but a small fraction, for example one-tenth, of that required if the mechanical brake alone is used. Consequently, temperature changes, wear of the friction brake, etc., have but a slight effect upon the total braking action which to large extent is electrical.

The mechanical braking force, generally represented by the curve Y, Fig. 3, is substantially constant and is more effective as the car 3 approaches zero speed, while on the contrary, the electrical braking action preponderates for higher speeds of the rotor R, that is at the beginning of the deceleration period, and, since its effectiveness is a function of the rotor speed, it substantially compensates for load variations. Referring to Fig. 3 the points $a$ and $b$ may represent respectively the speed of the motor M when in synchronism and when running at maximum load. The portion of the curve X between the points $x'$ and $x$, whose abscissæ are respectively $b$ and $a$, has a substantial change in slope due to its second power characteristic and the electrical braking action is therefore particularly effective for the range of speed variations due to the difference in load upon the motor M. More specifically, when the car is travelling at a speed, represented by the abscissa $a$, the total braking force applied is the sum of the mechanical braking force $a-y$, and the electrical braking force $a-x$, whereas when the car is travelling at a lower speed as represented by the abscissa $b$, the electrical component of the braking action $b-x'$ is materially less, the electrical braking action automatically decreasing to accommodate the decreased car speed, with the result that the car for a substantial variation in speed, coasts for a substantially constant distance and stops with its floor substantially flush with the desired landing.

The relation between the mechanical and electrical braking actions may be varied as desired by adjusting the tension of the spring 6, and/or the position of the contact of rheostat 14, as above described. The effect of decreasing the tension of spring 6 is to lower the curve Y to, for example, the position of the curve Y'. The effect of changing the adjustment of rheostat 14 has been described above.

The system shown in Fig. 2 is substantially the same as that of Fig. 1. The solenoid b, however, is energized by direct current from the rectifier system A. When the contactor winding W is energized to connect the field windings of motor M to the power supply, the auxiliary contact b4 is moved into engagement with the auxiliary fixed contact l4 to connect the solenoid b to the output or direct current side of the rectifier A. Conversely, when the control switch S is moved to open circuit position, the engagement between the contacts l4 and b4 is broken, permitting the spring 6 to set the mechanical brake B. Preferably the solenoid is shunted by a resistor 16, which may be adjustable, to afford a retarded action whose magnitude will depend upon the ratio between the inductance of the solenoid b to the resistance of resistor 16. In this modification of my invention, the whole of the mechanical braking force is not immediately effective but builds up as indicated by that portion $y'$, of the curve Y, Fig. 3a. This retarded action tends to avoid an abrupt braking action and other things remaining constant, effects a higher ratio between the electrical and mechanical braking components of the total braking force, as effected at the beginning of the deceleration period.

When two-speed alternating current motors are used, the initial braking action may be effected in a known manner by changing the field connections so that the number of poles is increased and the motor is running at super-synchronous speed and feeding current back into the line. After the motor is decelerated to synchronous speed, the field windings are disconnected from the power supply and the remainder of the braking action is effected as above described in connection with Figs. 1 and 2. By thus utilizing my invention, the ratio of the two speeds of the motor may be low, as of the order of three to one, whereas the two-speed systems used at present necessarily employ a materially higher ratio, as of the order of six to one or higher. This high ratio can be obtained only by expensive motors and the braking action leaves much to be desired. My invention can be applied to the high ratio motors but permits the use of the cheaper low-ratio motors.

While the system in Fig. 1 utilizes three-phase alternating current it will be understood that the power supply may have a greater or smaller number of phases or may be direct current. In the latter case, in braking, the motor windings are disconnected from the power source and connected to the generator G connected to or driven by the motor, so that the potential of the field current decreases with motor speed, as above described. In this modification the field of the generator G may be excited from the D. C. power lines for the motor or from any other suitable source of direct current.

Figure 4:
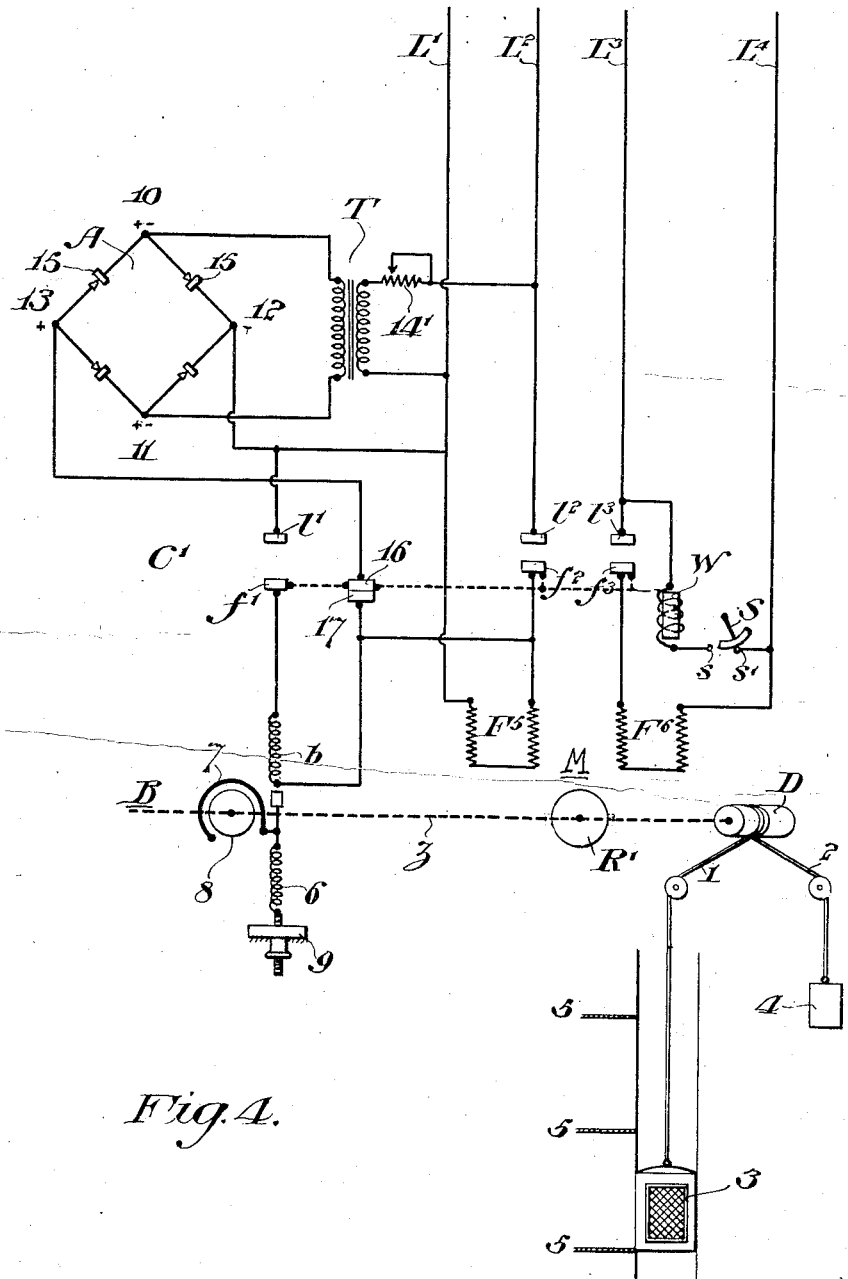
Fig. 4 illustrates diagrammatically another form of elevator system embodying my invention.

The arrangement shown in Fig. 4 is generally similar in operation to that of Fig. 1, the main difference being that direct current derived from the alternating current supply lines for the elevator motor is directly impressed upon the motor windings for effecting the electrical braking action, without interposition of a direct current generator, as generator G, Fig. 1. The field windings F5 and F6 of the elevator motor are adapted to be energized respectively from the phases L1, L2 and L3, L4. When the control switch S is moved to closed circuit position, bridging the contacts s, s1, the winding W of the contactor C' is energized to move the contacts f2, f3 into engagement with the fixed contacts 12, 13, completing the circuits of the motor fields, and simultaneously, by engagement of contact f1 with fixed contact l1, effecting energization of the solenoid b to release the mechanical brake B.

When it is desired to stop the elevator, the switch S is opened to de-energize the winding W which opens the circuits of the field windings F5 and F6 and of the solenoid b, de-energizing the motor and setting the mechanical brake. The back-contacts 16, 17 of the contactor C' connect the output or direct current side of the rectifier system A to the field F5 of the elevator motor, to produce an electrical braking action as in Fig. 1. Preferably, and as indicated, the step-down transformer T is interposed between the input side of the rectifier A and the phase L1, L2, which supplies the current to the rectifier. The strength of the direct current field to predetermine the electrical braking characteristic may be controlled in any suitable manner, for example, the rheostat 14' may be included in the input circuit of the transformer T for determining the A. C. potential impressed upon the rectifier A.

As in the system of Fig. 1, the mechanical and electrical braking actions are complementary, and preferably the mechanical brake is selected or adjusted to exert a force only slightly greater than necessary to hold the car. The total effective braking force when the cage is moving at its maximum speed, that is, at the beginning of deceleration, is materially greater than when the cage is approaching zero speed, since the electrical braking action is a direct function of the speed of the motor armature. However, as the voltage impressed upon the motor windings is constant, the braking force does not vary as the square of the speed, as in the system of Fig. 1, but at a lower rate, specifically, substantially as the first power of the motor speed.

It will be understood that the system of Fig. 2 in which the rectifier directly supplies the windings of the elevator motor is not limited to two phase systems but may be utilized when the alternating power supply is of greater or smaller number of phases. Further, the solenoid brake, as in Fig. 2, may be energized by direct current. Also, the invention of Fig. 4 may be utilized with two-speed motors in substantially the same manner as the systems of Figs. 1 and 2.

What I claim is:

In an elevator system, the method of quickly and smoothly decelerating the alternating current motor which comprises disconnecting the motor from the alternating current power supply, applying a mechanical braking force, increasing said force during the deceleration period to a final magnitude not materially in excess of that required to restrain the unbalanced weight of the system, simultaneously applying an electrical braking force materially greater than the initial mechanical braking force, and decreasing the electrical braking force during the deceleration period at a rate varying substantially as the square of the speed of the motor.

JOSEPH H. BORDEN.